Jan. 5, 1943.   F. M. BELL   2,307,190
BAND SAW
Filed May 20, 1940

INVENTOR
Floyd M Bell
BY
Fred A Parsons
ATTORNEY

Patented Jan. 5, 1943

2,307,190

UNITED STATES PATENT OFFICE 2,307,190

BAND SAW

Floyd M. Bell, Milwaukee, Wis.

Application May 20, 1940, Serial No. 336,077

2 Claims. (Cl. 143—31)

This invention relates to improvements in band saws and more particularly to the type using a flexible endless saw band guided and supported on pulleys.

Objects of my invention include improvement in the means for adjusting and supporting the wheels or pulleys which carry the saw band, and in the arrangement and relationship of the pulleys, and in the construction of the frame of the machine.

A particular object is to provide such improvements singly or in combination in a form adapted for relatively deep throat machines, that is to say where a relatively large space is provided for rearward work clearance between the cutting run of the saw and the frame.

It is a further purpose generally to simplify and improve the construction and operation of band saws, and of the relationship of the parts of the machine, and still other objects will be apparent from this specification.

The invention includes the construction and combination of parts herein illustrated, described and claimed, and such modifications thereof as may be equivalent to the structure claimed.

The same reference characters have been used for the same parts throughout this specification, and in the drawing.

Figure 1:
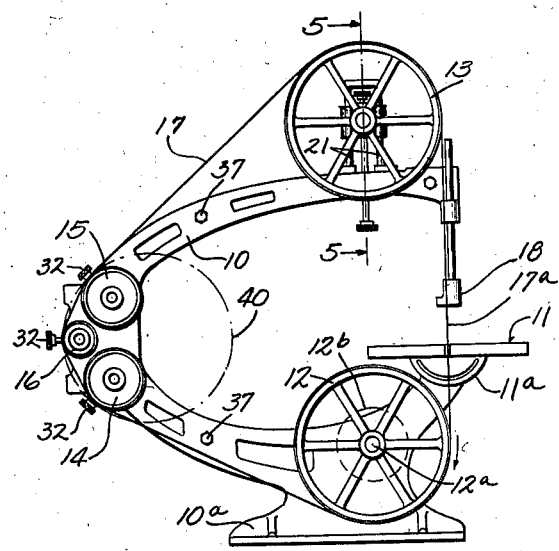
Figure 1 is a front elevation of a band saw machine incorporating the invention.

The machine of the drawing includes a frame, generally denoted as 10, which has a base portion 10a and carries a work supporting table 11, the table being preferably arranged in swivel guides such as 11a, in the usual manner.

A saw supporting and driving lower pulley 12 is fixed on a shaft 12a which is rotatably carried by the frame and may be driven from any suitable power source, such as a motor, not shown, as for example by a pulley 12b fixed on the shaft 12a. A rotatable upper pulley 13 and rotatable rear pulleys 14, 15, 16 are also carried by the frame 10 and, together with pulley 12, support an endless saw band, such as 17, for a front run or portion 17a to continuously move downwardly through table 11, there being a vertically adjustable saw guide device, generally denoted as 18, of any suitable well-known form, to support the saw against lateral thrust during sawing operations. Each of the pulleys may be provided with a facing of rubber, or similar material as shown for the pulley 15 at 15a.

Figure 6:
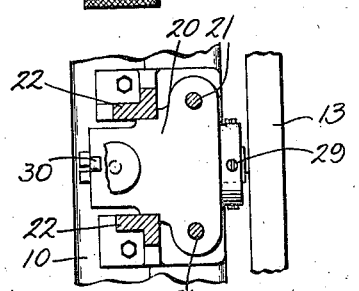
Figure 6 is a partial plan or top view taken at line 6—6 of Fig. 5.

The upper pulley 13 is supported from frame 10 for vertical adjustment by the means of a vertically adjustable carrier 20, the carrier being movable on parallel guide members 21, 21 fixed in a bracket 22 that is fixed on frame 10. Carrier 20 may have additional suitable guide surfaces directly engaging vertical slide surfaces on the bracket, as shown by the mutually engaged carrier and bracket surfaces of Fig. 6. The carrier 20 is adjusted upwardly by the means of an adjusting screw 24, for which suitable nut threads are provided in frame 10. The carrier is normally continuously urged in the other direction by gravity and by the pull of the saw band, and the carrier adjustment upwardly operates to provide suitable tension on the saw band.

Each of the pulleys 13, 14, 15, 16 is supported for both horizontal and lateral adjustment of the pulley center, and also for angular adjustment of the pulley axis. The mechanism for these adjustments is substantially the same for each of the pulleys and therefore will be explained in detail only for the pulley 15. In each instance the pulley is rotatably supported on a stud such as 26, preferably by anti-friction bearings such as 27, and is prevented from axial movement relative to the stud. The studs such as 26 are fixed in the bore of tube or sleeve members such as 28 and, at the one end, the unit is prevented from axial movement by screws such as 29, each having points engaging a suitable configuration on the tube exterior, as shown. The frame provides an opening which is larger than the tube, and by suitable adjustment of the screws such as 29 the tube and pulley carried thereby may be adjusted for adjusting the pulley axis in any lateral direction, as stated.

Figure 2:
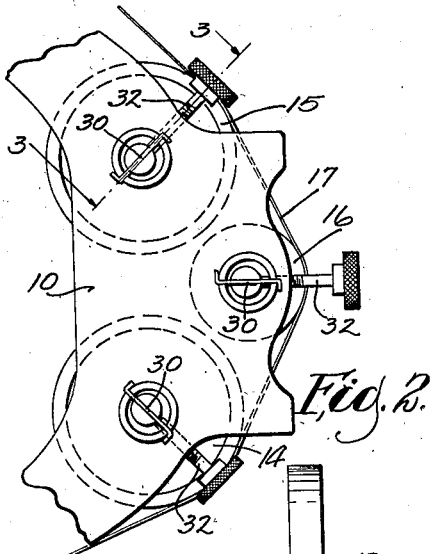
Figure 2 is an enlarged rear elevation of the Fig. 1 left side portion of the machine.

At the other end the tubes such as 28 are each slotted to slidably engage over a guide bar or strip member, such as 30 which is suitably fixed with the frame. In this instance the guide strips 30 are extended and fixed in suitable slots provided in bosses fixed with the frame, the ends of the strips being bent to prevent endwise shifting, as shown in Fig. 2. The slotted ends of the tubes may be shifted along the guide members such as 30 by the means of adjusting screws, such as 32.

The angular direction in which the guide members such as 30 permit of adjustment of the ends of the pulley carrier members such as 28, and the thrust direction of the screws such as 32 relative to such adjustment is so arranged that the axis of the associated saw supporting pulley may be adjusted for the saw band to track accurately on each pulley, without tending to run off the pulley, while the adjusting screws such as 32 receive the thrust set up by the pressure of the saw band over the pulley. The drawing shows the approximate relative angles of the guide members and screw thrust directions for each of the pulleys 13, 14, 15, 16 which has been found to work well in practice with the pulley arrangement here shown.

Figure 3:
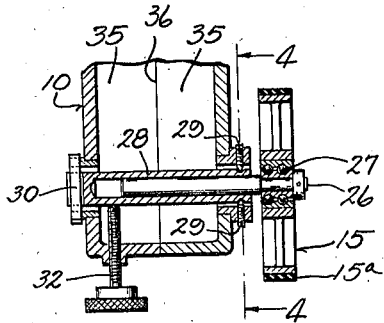
Figure 3 is a sectional view showing a pulley support, taken at line 3—3 of Fig. 2.
Figure 4:
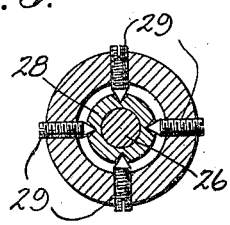
Figure 4 is an enlarged partial section taken at line 4—4 of Fig. 3.
Figure 5:
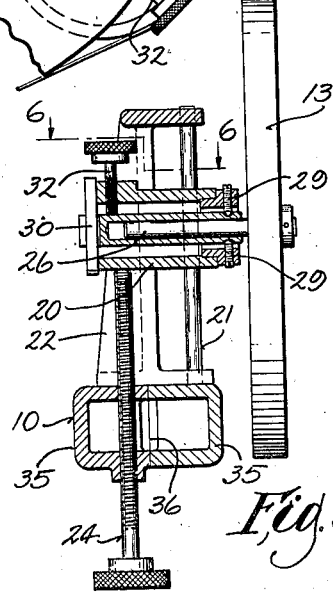
Figure 5 is an enlarged partial vertical section taken at line 5—5 in Fig. 1.

It will be understood that, if desired, a corresponding or similar adjustment may be provided for the pulley 12, for both or either of the lateral and pivotal adjustments as described.

Where the frame of the machine provides a relatively large throat space or work clearance, as here shown, difficulty is experienced in constructing a frame which provides sufficient lateral and vertical resistance without exceeding desirable weight of material and while still maintaining construction convenience. It has been found that a frame constructed with oppositely formed similar channel-like portions such as indicated at 35, 35, Fig. 5, separated along a vertical transverse plane, such as is indicated by the line 36, Figs. 3, 5, is particularly adapted to the purpose for this type of machine. It will be understood that the opposite channel portions are separately formed and bolted together, as by suitably positioned bolts such as 37, 37, Fig. 1, and that each of the frame portions are provided with suitably disposed interior strengthening ribs, etc. This provides a frame which is simple to construct, pleasing in appearance, and of maximum strength with a given weight of material.

The arrangement of the three rear pulleys 14, 15, 16, as here shown, has been found particularly efficient and useful in this type of machine, especially where the various pulleys are adjustable, as has been described. Three pulleys, although relatively small in diameter, guide the saw band without short bends therein, such as would cause the saw band to crystallize and break. Thus, for example, a single pulley equivalent in this respect to the three pulleys arranged as here shown would have a diameter approximately as indicated in the dot and dash line 40, Fig. 1, such pulley diameter greatly reducing the effective working space or throat distance at the left, Fig. 1, of the cutting run 17a of the saw band.

What is claimed is:

1. In a band saw machine having a frame, a work table supported therefrom, and a plurality of spaced pulleys supported from said frame for supporting a saw band and guiding a cutting portion of the band for movement through an opening in said table, the combination of mechanism for tilting the axis of one of said pulleys relative to another thereof including a non-rotatable member supported from said frame for tiltable adjustment movement, said tiltable member rotatably supporting said tiltable pulley at the one side of the tilting axis of the member, said tiltable member at an end at the other side of said tilting axis providing a slot extending in the direction of the tilting movement of said end about said axis, a guide member fixed with said frame and slidably engaging said slot, and adjusting means for movement of said slotted end along said guide member, said tiltable member being supported for bodily adjustment of said tiltable pulley in either direction in each of mutually transverse planes.

2. In a band saw machine having a frame, a work table supported therefrom, and a plurality of spaced pulleys supported from said frame for supporting a saw band and guiding a cutting portion of the band for movement through an opening in said table, the combination of mechanism for tilting the axis of one of said pulleys relative to another thereof including an extended member rotatably supporting said tiltable pulley and providing exterior abutment portions adjacent one end of the member and approximately in the same plane transverse to the direction of extension of the member, a plurality of abutment screws carried by said frame to engage different of said abutment portions respectively, said abutment screws and abutment portions providing means supporting the member both for tilting movement relative to said plane and for lateral bodily adjustment of the member, the other end of said member providing a slot extended laterally in the direction of the tilting movement of said other end, a guide member engaging said slot for guiding said tilting movement of said other end, and an adjusting device for movement of said slotted end along said guide member.

FLOYD M. BELL.